United States Patent
Habu et al.

(10) Patent No.: US 10,688,997 B2
(45) Date of Patent: Jun. 23, 2020

(54) LANE MERGING DETERMINATION APPARATUS

(71) Applicant: DENSO CORPORATION, Kariya, Aichi-pref. (JP)

(72) Inventors: Toshiya Habu, Kariya (JP); Takahisa Yokoyama, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 302 days.

(21) Appl. No.: 15/158,221

(22) Filed: May 18, 2016

(65) Prior Publication Data
US 2016/0339919 A1 Nov. 24, 2016

(30) Foreign Application Priority Data
May 19, 2015 (JP) .................. 2015-101570

(51) Int. Cl.
*B60W 30/18* (2012.01)
*B60W 10/18* (2012.01)
(Continued)

(52) U.S. Cl.
CPC ...... *B60W 30/18163* (2013.01); *B60W 10/06* (2013.01); *B60W 10/18* (2013.01);
(Continued)

(58) Field of Classification Search
CPC ....... B60W 2550/402; B60W 2520/10; B60W 30/18163; B60W 2550/14; B60W 50/14;
(Continued)

(56) References Cited

U.S. PATENT DOCUMENTS

| 2005/0015203 A1* | 1/2005 | Nishira ............... B60W 50/16 701/301 |
| 2010/0036599 A1* | 2/2010 | Froeberg ........... G01C 21/3461 701/532 |

(Continued)

FOREIGN PATENT DOCUMENTS

| JP | 2007-048042 | 2/2007 |
| JP | 2010231561 | 10/2010 |

OTHER PUBLICATIONS 2-page Google Search for "intersect" synonyms conducted on Mar. 5, 2019.*

*Primary Examiner* — Anshul Sood
(74) *Attorney, Agent, or Firm* — Maschoff Brennan

(57) ABSTRACT

A lane merging determination apparatus is provided which includes a first generation section that generates a first path, which is a prospective traveling path of an own vehicle, a second generation section that generates a second path corresponding to a traveling path of an adjacent vehicle, which is one of vehicles present ahead of the own vehicle and runs in a lane adjacent to a driving lane of the own vehicle, based on a history of positions of the vehicles, an intersection determination section that determines whether or not the first path and the second path intersect with each other; and a merging determination section that determines that the lanes merge with each other in front of the own vehicle, if the intersection determination section determines that the first path and the second path intersect with each other.

9 Claims, 6 Drawing Sheets

(51) Int. Cl.
*B60W 30/095* (2012.01)
*B60W 10/06* (2006.01)
*B60W 50/00* (2006.01)
*B60W 30/09* (2012.01)

(52) U.S. Cl.
CPC .... *B60W 30/0953* (2013.01); *B60W 30/0956* (2013.01); *B60W 50/0097* (2013.01); *B60W 30/09* (2013.01); *B60W 2420/42* (2013.01); *B60W 2420/52* (2013.01)

(58) Field of Classification Search
CPC .... B60W 30/09; B60W 30/12; B60W 30/143; B60W 30/18154; B60W 40/06; B60W 50/0097; B60W 10/06; B60W 10/18; B60W 30/0953; B60W 30/0956; B60W 2420/42; B60W 2420/52; G08G 1/096827; G08G 1/167; G08G 1/096844; G08G 1/096838; G08G 1/166; G08G 1/01; G08G 1/096811; G08G 1/096816; G08G 1/16; G08G 1/163; G08G 1/205; H04W 4/046; G01C 21/3462; G01C 21/26; G01C 21/34; G01C 21/3415; G01C 21/3658; G01C 21/3697; G06Q 10/04; G06Q 30/0224; G06Q 50/30; G01S 13/931; G05D 1/0088; G07C 5/008
USPC ......... 701/2, 25, 27, 41, 118, 119, 300, 301, 701/409, 423, 532, 533; 702/5; 705/4; 362/135
See application file for complete search history.

(56) References Cited

U.S. PATENT DOCUMENTS

| | | | | |
|---|---|---|---|---|
| 2011/0106341 A1* | 5/2011 | Kinoshita | ............ | G05D 1/0289 701/2 |
| 2011/0224892 A1* | 9/2011 | Speiser | ............ | G08G 1/01 701/118 |
| 2011/0224893 A1* | 9/2011 | Scofield | ............ | G01C 21/3492 701/119 |
| 2012/0078500 A1* | 3/2012 | Yamada | ............ | B60W 50/14 701/301 |
| 2012/0116678 A1* | 5/2012 | Witmer | ............ | G01C 21/32 702/5 |
| 2012/0195029 A1* | 8/2012 | Leyden | ............ | G08G 1/095 362/135 |
| 2013/0006464 A1* | 1/2013 | Speiser | ............ | G08G 1/01 701/25 |
| 2013/0099911 A1* | 4/2013 | Mudalige | ............ | G08G 1/163 340/438 |
| 2013/0238192 A1* | 9/2013 | Breu | ............ | G01S 13/726 701/41 |
| 2013/0282224 A1* | 10/2013 | Yazaki | ............ | A01D 34/008 701/24 |
| 2013/0282271 A1* | 10/2013 | Rubin | ............ | G08G 9/02 701/423 |
| 2014/0032047 A1* | 1/2014 | Voelz | ............ | B62D 15/0255 701/41 |
| 2014/0257686 A1* | 9/2014 | Feldman | ............ | G06F 17/00 701/300 |
| 2014/0365104 A1* | 12/2014 | Sasaki | ............ | B60W 30/18154 701/119 |
| 2015/0185026 A1* | 7/2015 | Hightower | ............ | G01C 21/3658 701/533 |
| 2015/0241242 A1* | 8/2015 | Rings | ............ | G01C 21/3691 701/465 |
| 2015/0291146 A1* | 10/2015 | Prakah-Asante | ..... | B60W 10/06 701/37 |
| 2016/0090087 A1* | 3/2016 | Lee | ............ | B60W 30/143 701/93 |
| 2016/0161271 A1* | 6/2016 | Okumura | ............ | B60W 30/09 701/25 |
| 2016/0167652 A1* | 6/2016 | Slusar | ............ | B60W 30/143 701/27 |
| 2016/0171521 A1* | 6/2016 | Ramirez | ............ | G06Q 30/0224 701/409 |
| 2016/0171621 A1* | 6/2016 | Bogovich | ............ | G06Q 40/08 705/4 |
| 2016/0214612 A1* | 7/2016 | Kashiba | ............ | B60W 10/04 |
| 2016/0298976 A1* | 10/2016 | Sato | ............ | G08G 1/096827 |
| 2016/0305787 A1* | 10/2016 | Sato | ............ | G05D 1/0088 |
| 2016/0318518 A1* | 11/2016 | Suzuki | ............ | B60W 30/18163 |
| 2016/0325753 A1* | 11/2016 | Stein | ............ | B60W 40/06 |

\* cited by examiner

LANE MERGING DETERMINATION APPARATUS

CROSS-REFERENCE TO RELATED APPLICATION

This application is based on and claims the benefit of priority from earlier Japanese Patent Application No. 2015-101570 filed May 19, 2015, the description of which is incorporated herein by reference.

BACKGROUND

Technical Field

The present invention relates to a lane merging determination apparatus that determines merging of lanes in front of an own vehicle.

Related Art

To support driving a vehicle, it is required to consider other vehicles at a lane merging point. Thus, the driving support apparatus disclosed in JP-A-2010-231561 detects information on a lane in which an own vehicle runs from an image of a white lane captured by a white line recognition camera. When the lane width decreases in front of the own vehicle, and a turning radius of the own vehicle is larger than a curve radius of a right white line or a left white line, the driving support apparatus determines that lanes merge with each other.

The above driving support apparatus is required to recognize a white line to determine the merging of lanes. Hence, when the white line cannot be recognized due to fading or the like, the driving support apparatus cannot determine the merging of the lanes.

SUMMARY

An embodiment provides a lane merging determination apparatus that can determine merging of lanes without recognizing a white line.

As an aspect of the embodiment, a lane merging determination apparatus is provided which includes a first generation section that generates a first path, which is a prospective traveling path of an own vehicle; a second generation section that generates a second path corresponding to a traveling path of an adjacent vehicle, which is one of vehicles present ahead of the own vehicle and runs in a lane adjacent to a driving lane of the own vehicle, based on a history of positions of the vehicles; an intersection determination section that determines whether or not the first path generated by the first path generation section and the second path generated by the second path generation section intersect with each other; and a merging determination section that determines that the lanes merge with each other in front of the own vehicle, if the intersection determination section determines that the first path and the second path intersect with each other.

DETAILED DESCRIPTION OF THE PREFERRED EMBODIMENTS

Figure 1:
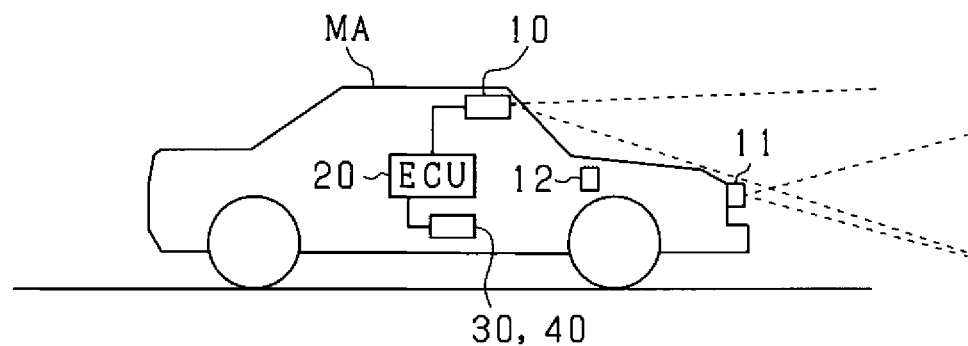
FIG. 1 is a drawing showing locations where an in-vehicle camera and a millimeter-wave radar are mounted in a vehicle.

With reference to the accompanying drawings, hereinafter are described embodiments of a lane merging determination apparatus. The lane merging determination apparatus of each embodiment is an in-vehicle apparatus installed in a vehicle. The vehicle in which the lane merging determination apparatus is installed performs traveling control for making an own vehicle follow a preceding vehicle running ahead of the own vehicle in a lane on which the own vehicle runs. Throughout the embodiments described below, components identical with or similar to each other are given the same reference numerals for the sake of omitting unnecessary explanation.

First Embodiment

Figure 2:
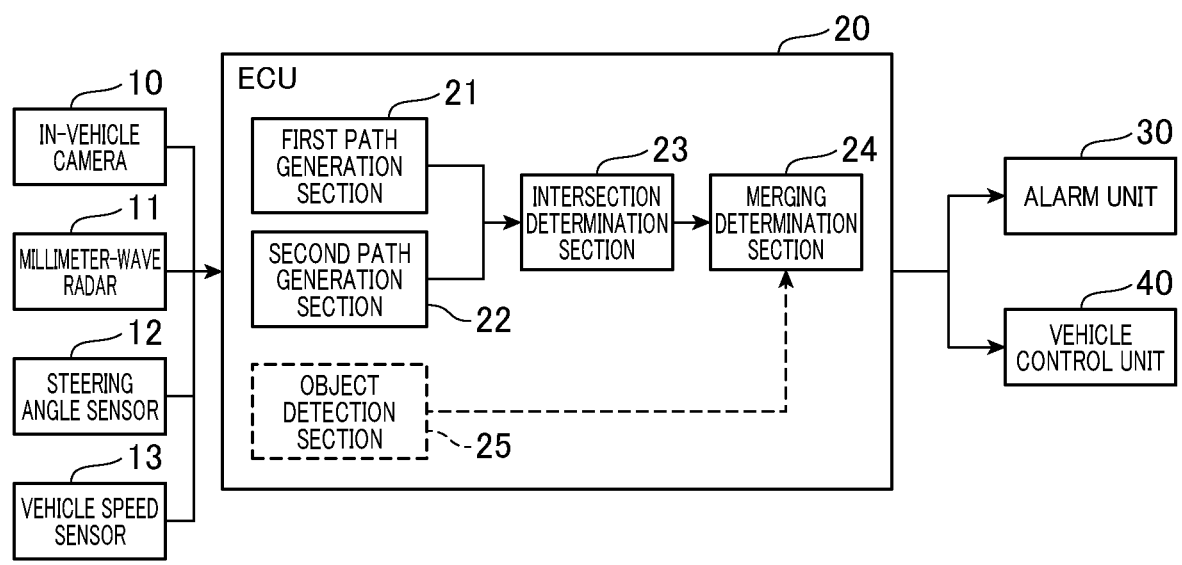
FIG. 2 is a block diagram showing a schematic configuration of a lane merging determination apparatus.

The schematic configuration of the lane merging determination apparatus according to the first embodiment is described with reference to FIG. 1 and FIG. 2. The lane merging determination apparatus is configured by an ECU (electronic control unit) 20. The ECU 20 is a computer including a CPU, a ROM, a RAM, and an I/O. When the ECU 20 determines that lanes merge with each other based on information received from an in-vehicle camera 10, a millimeter-wave radar 11, a steering angle sensor 12, and a vehicle speed sensor 13, the ECU 20 transmits a merging signal to an alarm unit 30 and a vehicle control unit 40.

The in-vehicle camera 10 is a monocular camera configured by a CCD image sensor, a CMOS image sensor, a near-infrared sensor, or the like, or a stereo camera. The in-vehicle camera 10 captures images of the peripheral environment of the own vehicle MA to successively transmit image information of the captured images to the ECU 20. As shown in FIG. 1, the in-vehicle camera 10 is disposed, for example, in the vicinity of the top edge of the windshield of the own vehicle MA, and captures images of an area extending ahead of the own vehicle MA within a range having a first predetermined angle centering on an imaging axis.

The millimeter-wave radar 11 is a sensor that transmits a transmission wave, which is an electromagnetic wave, and receives a reflected wave, which is the transmission wave reflected from an object, to detect the object. As shown in FIG. 1, the millimeter-wave radar 11 is disposed at a front end of the own vehicle MA and transmits a transmission wave so as to scan an area extending ahead of the own vehicle MA within a range having a second predetermined angle centering on a reference axis. The millimeter-wave radar 11 generates ranging data at predetermined time intervals based on a time period between the transmission and the reception to successively transmit the generated ranging data to the ECU 20. The ranging data includes a direction in which the object is present, a distance to the object, and a relative speed of the object with respect to the own vehicle MA.

The steering angle sensor 12 detects a steering angle of the own vehicle MA at predetermined intervals to successively transmit the detected steering angle information to the ECU 20. The vehicle speed sensor 13 detects a vehicle speed of the own vehicle MA at predetermined intervals to successively transmit the detected vehicle speed information to the ECU 20.

The alarm unit 30 is a human-machine interface (HMI) such as a display and a loudspeaker. When receiving a merging signal from the ECU 20, the alarm unit 30 outputs an alarm for warning the driver.

The vehicle control unit 40 includes a brake controller and an engine controller. When receiving a merging signal from the ECU 20, the vehicle control unit 40 performs brake control and engine control for the own vehicle MA to adjust brake force and output of the engine.

In the ECU 20, the CPU executes a program stored in the ROM to realize functions of a first path generation section 21, a second path generation section 22, an intersection determination section 23, and a merging determination section 24.

The first path generation section 21 (first generation means) generates a predicted path, which is a prospective traveling path of the own vehicle MA. As shown in FIGS. 3 to 6, when a preceding vehicle MC followed by the own vehicle MA is present ahead of the driving lane of the own vehicle MA, the traveling path of the preceding vehicle MC becomes a prospective traveling path of the own vehicle MA. Hence, when the preceding vehicle MC followed by the own vehicle MA is present in a driving lane of the own vehicle MA, the first path generation section 21 first generates a traveling path of the preceding vehicle MC based on a history of positions of the preceding vehicle MC.

Specifically, the first path generation section 21 calculates positions of the preceding vehicle MC at predetermined intervals based on image information received from the in-vehicle camera 10 and ranging data (direction and distance) received from the millimeter-wave radar 11 to store the calculated positions of the preceding vehicle MC in time series. The position of the preceding vehicle MC consists of a longitudinal position in the traveling direction and a lateral position of the own vehicle MA in the width direction. When calculating the position of a target vehicle (another vehicle) from the image information, the first path generation section 21 extracts an edge from the image information to detect the preceding vehicle, and then calculates the position of the preceding vehicle. When the position of the preceding vehicle is calculated from the ranging data, although the accuracy of the distance in the traveling direction is relatively high, the accuracy of the distance to the lateral position is relatively low. In a case where the in-vehicle camera 10 is a monocular camera, when the position of the preceding vehicle MC is calculated from the image information, although the accuracy of the distance to the lateral position is relatively high, the accuracy of the distance in the traveling direction is relatively low. Hence, combining the image information with the ranging data can increase the accuracy of calculating the position of the preceding vehicle MC. The first path generation section 21 connects the positions of the preceding vehicle MC stored in time series to generate a traveling path of the target vehicle.

Figure 3:
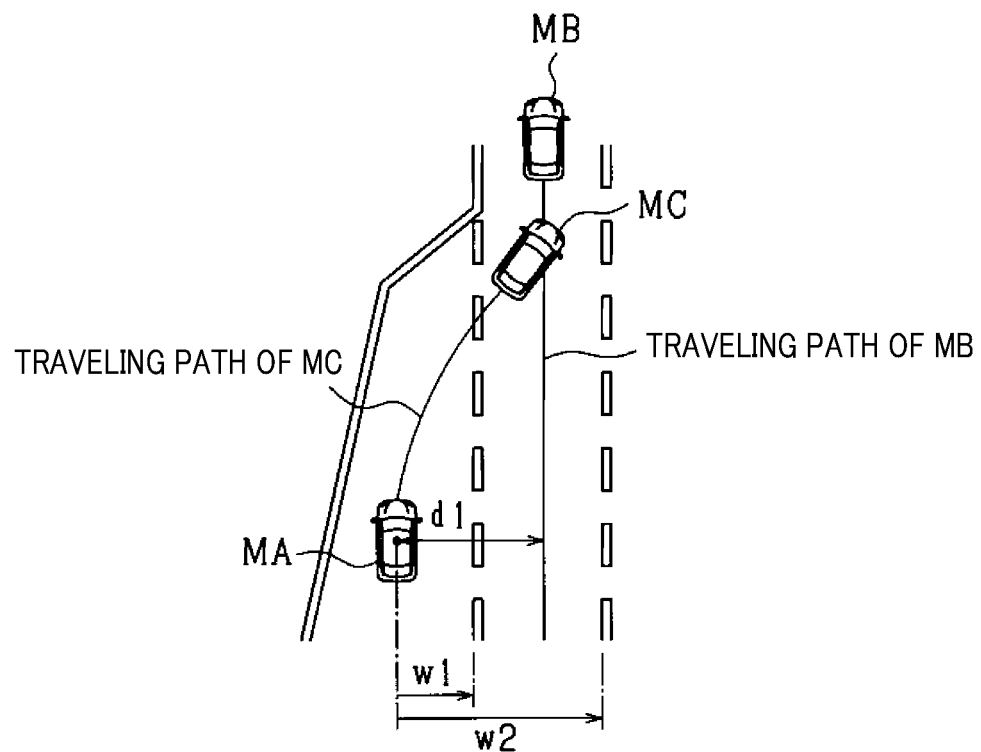
FIG. 3 is a diagram showing intersection of a traveling path of a preceding vehicle and a traveling path of an adjacent vehicle.
Figure 4:
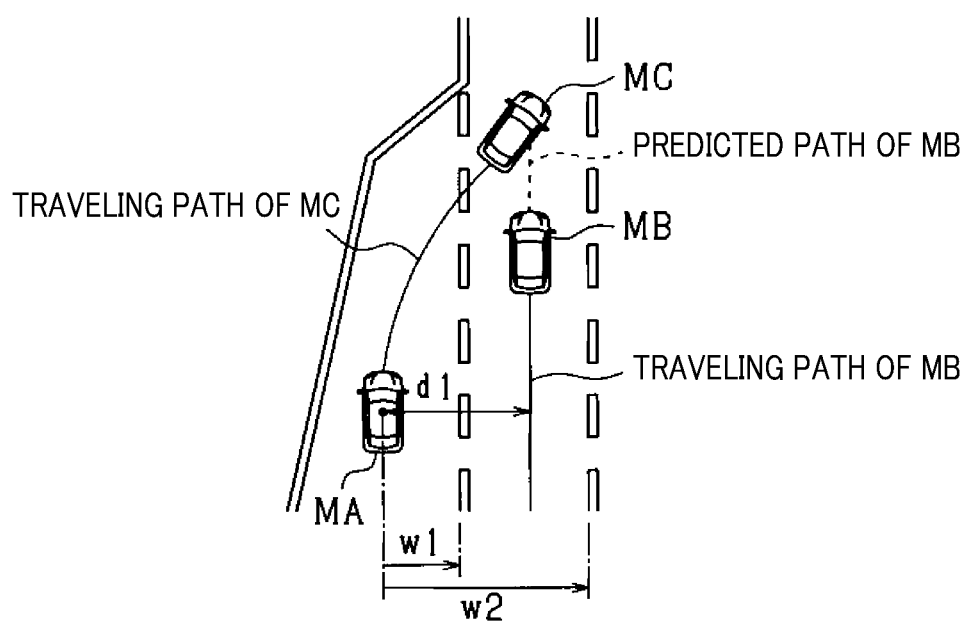
FIG. 4 is a diagram showing intersection of a traveling path of a preceding vehicle and a predicted path of an adjacent vehicle.
Figure 5:
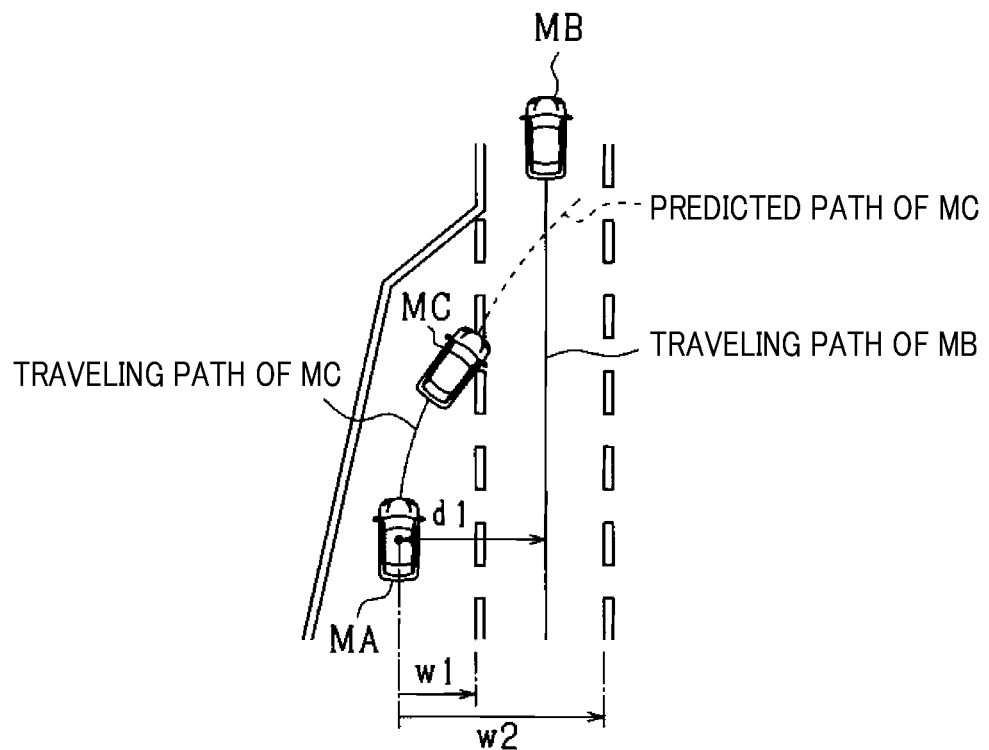
FIG. 5 is a diagram showing intersection of a predicted path of a preceding vehicle and a traveling path of an adjacent vehicle.
Figure 6:
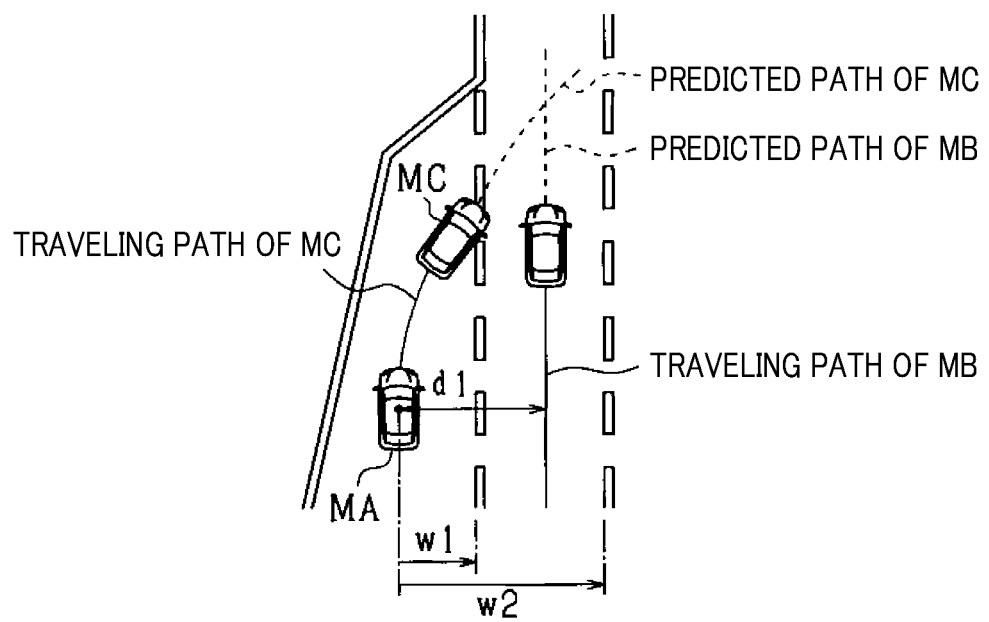
FIG. 6 is a diagram showing intersection of a predicted path of a preceding vehicle and a predicted path an adjacent vehicle.

Then, as shown in FIG. 3 and FIG. 4, when the generated traveling path of the preceding vehicle MC is longer than a predetermined distance, the generated traveling path of the preceding vehicle MC is defined as a predicted path of the own vehicle MA. The predetermined distance is enough to determine merging of the lanes in front of the own vehicle MA. In addition, as shown in FIG. 5 and FIG. 6, when the generated traveling path of the preceding vehicle MC is not longer than the predetermined distance, the first path generation section 21 extends the generated traveling path to generate a predicted path that is a prospective traveling path of the preceding vehicle MC. Then, the first path generation section 21 defines the predicted path of the preceding vehicle MC as a predicted path of the own vehicle MA.

Figure 7:
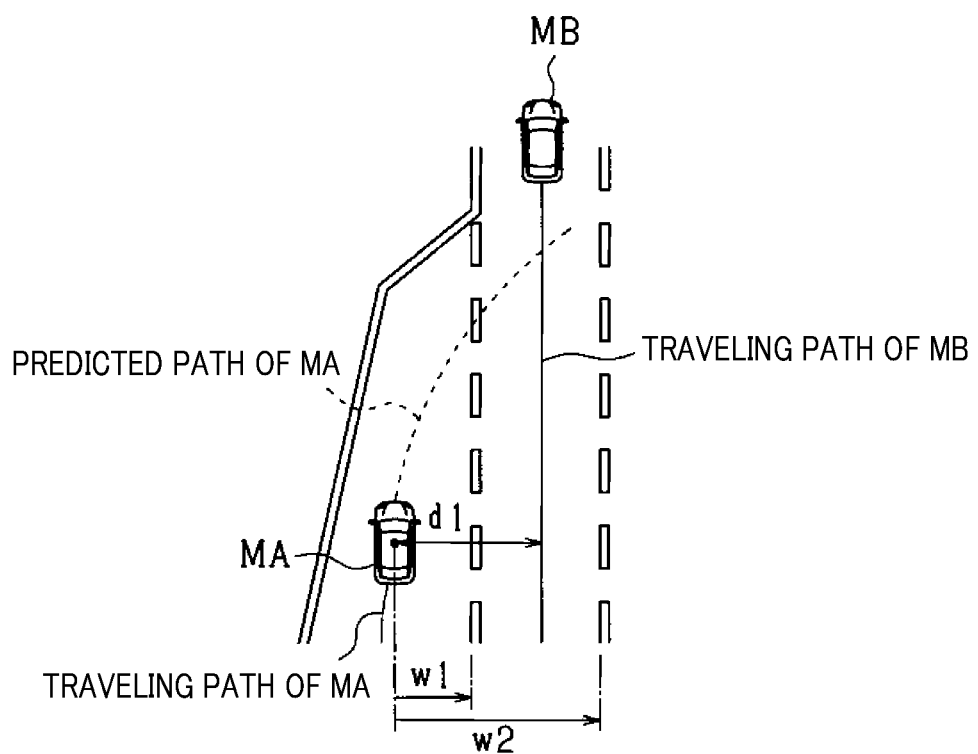
FIG. 7 is a diagram showing intersection of a predicted path predicted from a traveling path of an own vehicle and a traveling path of an adjacent vehicle.

In addition, as shown in FIG. 7, for example, when the distance between the own vehicle MA and the preceding vehicle MC becomes too long to allow the preceding vehicle MC, which is being followed by the own vehicle MA, to be detected, the first path generation section 21 generates a predicted path of the own vehicle MA from a history of positions of the own vehicle MA. Specifically, the first path generation section 21 calculates a history of positions of the own vehicle MA based on the steering angle information transmitted from the steering angle sensor 12 and the vehicle speed information transmitted from the vehicle speed sensor 13. Then, the first path generation section 21 connects the calculated positions of the own vehicle MA to generate a predicted path of the own vehicle MA.

The second path generation section 22 (second generation means) generates an adjacent path corresponding to a traveling path of an adjacent vehicle MB, which is one of the vehicles (target vehicles) present ahead of the own vehicle MA and runs in a lane adjacent to the driving lane of the own vehicle MA, based on the histories of positions of the target vehicles present ahead of the own vehicle MA. Specifically, as in the case of the first path generation section 21, the second path generation section 22 first generates traveling paths of target vehicles from histories of positions of the target vehicles. Then, the second path generation section 22 selects a traveling path, which one of the generated traveling paths of the target vehicles, as a traveling path of the adjacent vehicle MB. The lateral distance d1 between a lateral position on the selected traveling path and a lateral position of the own vehicle MA is larger than a threshold value w1 and smaller than a threshold value w2. The lateral position is a position of the own vehicle MA in the width direction (position on a coordinate in the lateral direction). In the present embodiment, the origin of the lateral point is defined as the barycenter of the own vehicle MA. However, any base point can be defined as the origin of the lateral point if the distance between the own vehicle MA and the target vehicle in the width direction can be determined.

In addition, the threshold value w1 is half the assumed width of the driving lane of the own vehicle MA. The threshold value w2 is about three times the threshold value w1. That is, the second path generation section 22 selects a traveling path, which is one of the generated traveling paths of target vehicles and is present in a lane next to the driving lane of the own vehicle MA, as a traveling path of the adjacent vehicle MB. The assumed width of the driving lane may be a lane width of a typical road. When lane width information can be acquired from map information or from road-to-vehicle communication, the assumed width may be the acquired lane width. Note that the number of target vehicles for which the second path generation section 22 generates a traveling path depends on the capacity of the ECU 20.

As shown in FIG. 3, FIG. 5, and FIG. 7, when the traveling path of the selected adjacent vehicle MB is longer than a predetermined distance, the second path generation section 22 defines the traveling path of the selected adjacent vehicle MB as an adjacent path. That is, the second path generation section 22 defines the traveling path, along which the adjacent vehicle MB has actually run, as an adjacent path. In addition, as shown in FIG. 4 and FIG. 6, when the selected traveling path of the adjacent vehicle MB is not longer than the predetermined distance, the second path generation section 22 extends the selected traveling path to generate a predicted path that is a prospective traveling path of the adjacent vehicle MB. Then, the second path generation section 22 defines the predicted path of the preceding adjacent vehicle MB as an adjacent path.

The intersection determination section 23 (intersection determination means) determines whether or not the predicted path of the own vehicle MA generated by the first path generation section 21 and the adjacent path of the adjacent vehicle MB generated by the second path generation section 22 intersect with each other.

If the intersection determination section 23 determines that the predicted path of the own vehicle MA and the adjacent path of the adjacent vehicle MB intersect with each other, the merging determination section 24 (merging determination means) determines that the lanes merge with each other, that is, that the present lane decreases in width. In this case, as shown in FIG. 3, FIG. 5, and FIG. 7, when merging is determined in a state where the traveling path along which the adjacent vehicle MB actually runs is defined as an adjacent path, the merging of the lane can be prevented from being erroneously determined. For example, the predicted path of the adjacent lane, which curves, can be prevented from being predicted as a straight line, whereby the curve point can be prevented from being erroneously determined as a merging point of the lanes. In addition, as shown in FIG. 3 and FIG. 4, even when the traveling path of the preceding vehicle MC is defined as a predicted path of the own vehicle MA, the merging point of the lane can be prevented from being erroneously determined.

In addition, as shown in FIG. 4 and FIG. 6, when the merging is determined in a state where the predicted path of the adjacent vehicle MB is defined as an adjacent path, the merging of the lanes is determined before the adjacent vehicle MB reaches the merging point of the lanes. Hence, when the own vehicle MA reaches the merging point of the lanes, if the probability that another vehicle to be considered is present at the merging point is higher, the merging of the vehicles can be determined. Then, if determining that the lanes merge with each other, the merging determination section 24 transmits a merging signal to the alarm unit 30 and the vehicle control unit 40.

Note that, even when the lanes merge with each other in front of the own vehicle MA, the merging cannot be determined in a case where another vehicle is not running in the adjacent lane. In such a case, since another vehicle is not required to be considered, no trouble is likely to occur even if the merging cannot be determined.

Next, a procedure for determining the merging of lanes is described with reference to a flowchart shown in FIG. 8. The procedure is performed by the ECU 20 at predetermined time intervals. The procedure is assumed to be performed while the own vehicle MA is following the preceding vehicle.

First, the ECU 20 determines whether or not a preceding vehicle is present ahead of the own vehicle MA, and a traveling path of the preceding vehicle can be generated (S10). If the ECU 20 determines that a traveling path of the preceding vehicle can be generated (S10: YES), the ECU 20 generates the traveling path of the preceding vehicle from the history of positions of the preceding vehicle (S11). If the ECU 20 determines that a traveling path of the preceding vehicle cannot be generated because, for example, the preceding vehicle is lost sight of (S10: NO), the ECU 20 generates a traveling path of the own vehicle MA from the history of positions of the own vehicle MA (S12).

Next, the ECU 20 generates a predicted path of the own vehicle MA from the traveling path of the preceding vehicle generated in step S11 or the traveling path of the own vehicle MA generated in step S12 (S13). That is, any of the generated traveling path of the preceding vehicle, the predicted path predicted from the generated traveling path of the preceding vehicle, and the predicted path predicted from the generated traveling path of the own vehicle MA is defined as a predicted path of the own vehicle MA.

Next, the ECU 20 determines whether or not a traveling path of a target vehicle other than the preceding vehicle can be generated (S14). If a target vehicle other than the preceding vehicle is detected, the ECU 20 determines that the traveling path of the target vehicle can be generated (S14: YES). Then, the ECU 20 generates a traveling path of the target vehicle from the history of positions of the target vehicles (S15). If a target vehicle other than the preceding vehicle is not detected, the ECU 20 determines that the traveling path of the target vehicle cannot be generated (S14: NO), and ends the present process. In this case, even when the lanes merge with each other in front of the own vehicle MA, since a target vehicle other than the preceding vehicle is not present, no trouble is likely to occur.

Next, the ECU 20 determines whether or not there is a traveling path, the lateral distance d1 from the own vehicle MA of which is larger than the threshold value w1 and smaller than the threshold value w2, among the traveling paths of the target vehicles generated in step S15 (S16). That is, the ECU 20 determines whether or not there is a traveling path of an adjacent vehicle running in the lane next to the driving lane of the own vehicle MA among the traveling paths of the target vehicles generated in step S15.

If there is a traveling path, the lateral distance d1 of which is larger than the threshold value w1 and smaller than the threshold value w2, among the generated traveling paths of the target vehicles (S16: YES), the ECU 20 selects the traveling path as a traveling path of an adjacent vehicle (S17). If there is no traveling path, the lateral distance d1 of which is larger than the threshold value w1 and smaller than the threshold value w2, among the generated traveling paths of the target vehicles (S16: NO), the ECU 20 ends the present process. In this case, even when the lanes merge with each other in front of the own vehicle MA, since an adjacent vehicle is not present, no problem is likely to occur.

Next, the ECU 20 generates an adjacent path from the traveling path of the adjacent vehicle selected in S17 (S18). That is, the ECU 20 defines the selected traveling path of the adjacent vehicle or the predicted path predicted from the selected traveling path of the adjacent vehicle as an adjacent path.

Next, the ECU 20 determines whether or not the predicted path of the own vehicle generated in step S13 and the adjacent path generated in S18 intersect with each other (S19). If the predicted path of the own vehicle MA and the adjacent path intersect with each other (S19: YES), the ECU 20 determines that the lanes merge with each other in front of the own vehicle MA (S20). If the predicted path of the own vehicle MA and the adjacent path do not intersect with each other (S19: NO), the ECU 20 ends the present process. Note that, if the ECU 20 determines that there is merging, for example, the ECU 20 may notify the driver that the lanes merge with each other in front of and in the traveling direction of the own vehicle MA.

According to the first embodiment described above, the following advantages can be provided.

The predicted path of the own vehicle MA and the adjacent path of the adjacent vehicle MB are generated. Then, whether or not the predicted path of the own vehicle MA and the adjacent path of the adjacent vehicle MB intersect with each other is determined. If it is determined that the predicted path of the own vehicle MA and the adjacent path of the adjacent vehicle MB intersect with each other, it is determined that the lanes merge with each other in front of the own vehicle MA. Hence, using the predicted path of the own vehicle MA and the adjacent path of the adjacent vehicle MB can determine the merging of the lanes without recognizing a white line.

When the traveling path along which the adjacent vehicle MB has actually run, that is, the traveling path consisting of positions prior to the current position of the adjacent vehicle MB is defined as an adjacent path, a curve point or the like can be prevented from being erroneously determined as a merging point, whereby merging of lanes can be determined with high accuracy.

When the predicted path predicted from the traveling path of the adjacent vehicle MB, that is, the traveling path consisting of positions posterior to the current position of the adjacent vehicle MB is defined as an adjacent path, merging of lanes can be determined before the adjacent vehicle MB reaches a merging point. Hence, when the own vehicle MA reaches the merging point of the lanes, if the possibility that another vehicle to be considered is actually present is higher, the merging of the vehicles can be determined.

When the traveling path of the preceding vehicle MC followed by the own vehicle MA can be generated, the predicted path of the own vehicle MA can be generated from the traveling path of the preceding vehicle MC. Hence, the merging of the lanes can be determined at an early stage before the own vehicle MA reaches the merging point.

Even when the traveling path of the preceding vehicle MC followed by the own vehicle MA cannot be generated, the predicted path can be generated from the history of positions of the own vehicle MA to determining the merging of the lanes in front of the own vehicle MA.

The traveling path of the adjacent vehicle, which runs in a lane adjacent to the driving lane of the own vehicle NA, can be selected from the generated traveling paths of target vehicles based on the lateral distance between the lateral position on the traveling path of the target vehicle in the width direction of the own vehicle MA and the lateral position of the own vehicle MA.

Second Embodiment

Figure 9:
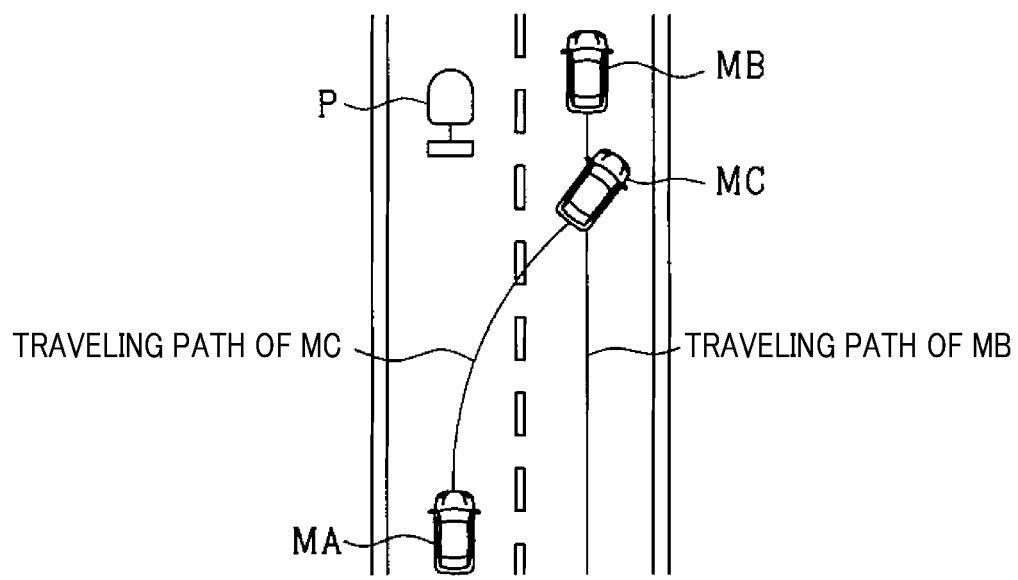
FIG. 9 is a diagram showing merging of a lane, forward of which a construction section is present, and an adjacent lane.

A lane merging determination apparatus according to the second embodiment is described with reference to FIG. 2 and FIG. 9 focusing on the differences from the lane merging determination apparatus according to the first embodiment.

When the own vehicle MA or the adjacent vehicle MB makes a lane change, the predicted path of the own vehicle MA and the adjacent path intersect with each other even when the roads are not joined to each other. When a lane change is made, no trouble is likely to occur even if it is determined that lanes merge with each other. However, it is desirable to determine joining of the roads with distinguishing this from a lane change. Hence, in the present embodiment, to determine joining of the roads with distinguishing this from a lane change, conditions for determining merging of lanes are added. In the present embodiment, not lanes such as a main line and a branch line but similar lanes are assumed to be merged with each other.

When lanes that are not, for example, a main line and a branch line, but are similar lanes, merge with each other, in one of the lanes, a construction section may be present or a large-sized failed vehicle may be stopped in front of the own vehicle MA. In such a case, as shown in FIG. 9, a stationary object such as a construction guide board and a sign or a stationary object such as a large-sized failed vehicle may be present in a lane whose width decreases. In contrast, in a case of the lane change, no stationary object is present in a lane in which the vehicle runs before lane change.

Thus, the ECU 20 includes functions of an object detection section 25. The object detection section 25 (object detection means) detects position information of a stationary object present ahead of the own vehicle MA. Specifically, the object detection section 25 acquires position information of a stationary object from image information received from the in-vehicle camera 10 and ranging data received from the millimeter-wave radar 11.

When the intersection determination section 23 determines that the predicted path of the own vehicle MA and the adjacent path intersect with each other, the merging determination section 24 determines that lanes merge with each other in front of the own vehicle MA, on condition that the position of the stationary object detected by the object detection section 25 is at the front of the own vehicle MA in the traveling direction.

Figure 8:
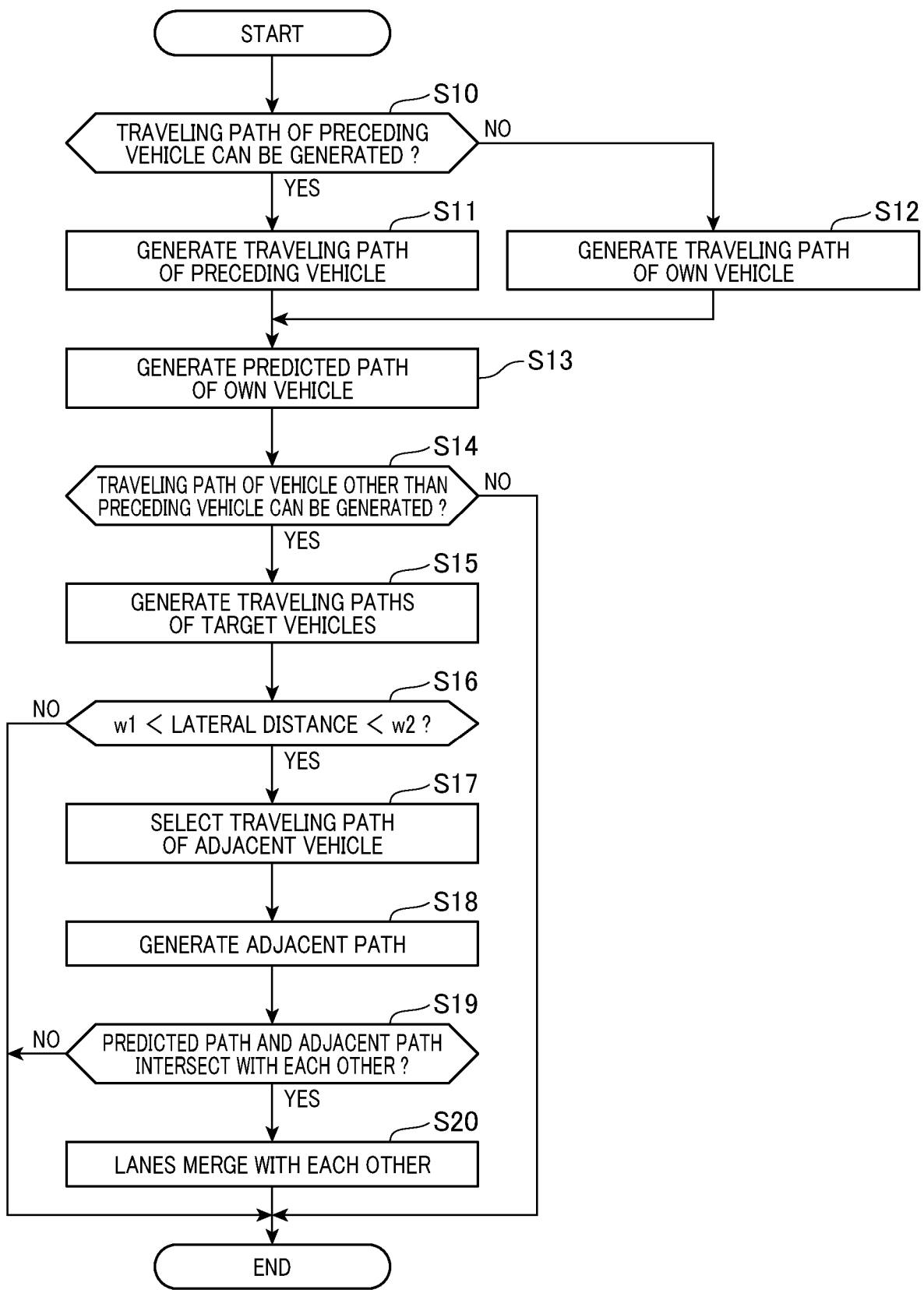
FIG. 8 is a flowchart of a procedure for determining merging of lanes.

In the present embodiment, in the step S19 in FIG. 8, it is determined whether or not the predicted path of the own vehicle MA and the adjacent path intersect with each other, and a stationary object is present at the front of the own vehicle MA in the traveling direction. If negative determination is made, the present process is ended. If positive determination is made, in S20, it is determined that the lanes merge with each other in front of the own vehicle MA.

According to the second embodiment described above, advantages similar to those of the first embodiment are provided. In addition, merging of lanes in front of the own vehicle MA can be determined, with distinguishing it a lane change.

Third Embodiment

Figure 10:
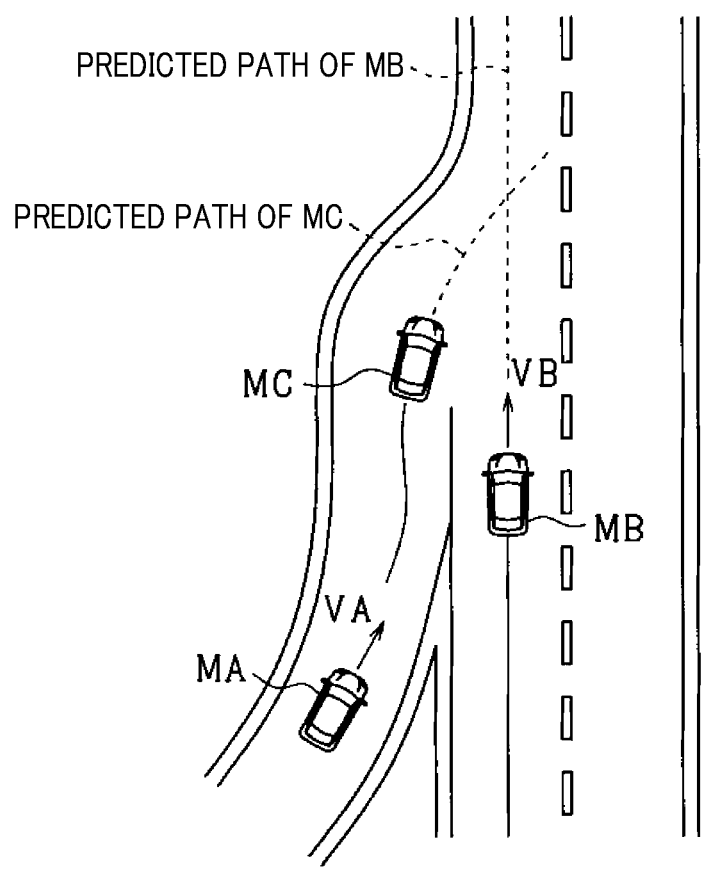
FIG. 10 is a diagram showing merging of a branch line and a main line.

A lane merging determination apparatus according to the third embodiment is described with reference to FIG. 2 and FIG. 10 focusing on the differences from the lane merging determination apparatus according to the second embodiment. In the third embodiment, a case is assumed where a main line and a branch line merge with each other.

When a main line and a branch line merge with each other, the speed of a vehicle running in the main line is generally higher than the speed of the vehicle running in the branch line. In contrast, when a lane change is made, the speed of a vehicle running in a lane before the lane change and the speed of the vehicle running in a lane after the lane change are often almost the same.

Thus, if the intersection determination section 23 determines that the predicted path of the own vehicle MA and the adjacent path intersect with each other, the merging determination section 24 determines that the lanes merge with each other in front of the own vehicle MA, on condition that a speed VB of the adjacent vehicle MB corresponding to the adjacent path is higher than a speed VA of the own vehicle MA and exceeds a speed threshold value. The speed VB of the adjacent vehicle MB is calculated from a history of positions of the adjacent vehicle MB and a period for calculating a position of the adjacent vehicle MB. Alternatively, a Doppler velocity of the adjacent vehicle MB with respect to the own vehicle MA may be detected to calculate the speed VB from the detected Doppler velocity. The speed threshold value may be, for example, the difference between the speed of a vehicle in the main line and the speed of a vehicle in the branch line, which are statistically obtained.

In the present embodiment, in the step S19 in FIG. 8, it is determined whether or not the predicted path of the own vehicle MA intersects with the adjacent path, and the speed VB of the adjacent vehicle MB is higher than the speed VA of the own vehicle MA and exceeds the speed threshold value. If negative determination is made, the present process is ended. If positive determination is made, in S20, it is determined that the lanes merge with each other in front of the own vehicle MA.

According to the third embodiment described above, advantages similar to those of the first embodiment are provided. In addition, merging of lanes in front of the own vehicle MA can be determined and distinguished from a lane change.

OTHER EMBODIMENTS

The second embodiment and the third embodiment may be combined with each other. That is, when the predicted path of the own vehicle MA and the adjacent path intersect with each other, and a stationary object is present at the front of the own vehicle MA in the traveling direction, merging of lanes is determined. In addition, when the predicted path of the own vehicle MA and the adjacent path intersect with each other, and the speed VB of the adjacent vehicle MB is higher than the speed VA of the own vehicle MA and exceeds a speed threshold value, merging of lanes is determined.

In a case where a branch line and a main line merge with each other, the distance between vehicles running in the main line is generally longer than the distance between vehicles running in the branch line so as not to prevent the vehicle from entering the main line from the branch line. In contrast, in a case of a lane change, the distance between vehicles running in the lane before the lane change and the distance between vehicles running in the lane after the lane change are often almost the same. Hence, in the third embodiment, when the adjacent path of the adjacent vehicle MB and the predicted path of the own vehicle MA intersect with each other, the merging of the lanes in front of the own vehicle MA may be determined on condition that the distance between vehicles in the adjacent lane is longer than the distance between vehicles in the driving lane of the own vehicle MA and exceeds a distance threshold value. In this case, in the step S19 in FIG. 8, it is determined whether or not the predicted path of the own vehicle and the adjacent path intersect with each other, and the distance between vehicles in the adjacent lane is longer than the distance between vehicles in the driving lane of the own vehicle MA and exceeds a distance threshold value. The distance between vehicles in the adjacent lane is calculated from the positions of the two vehicles present in the longitudinal direction. In addition, the distance between vehicles in the driving lane of the own vehicle MA is calculated from the positions of the own vehicle MA and the preceding vehicle MC. Note that, the second embodiment and the third embodiment may be combined with each other.

When the intersection point of the predicted path of the own vehicle MA and the adjacent path of the adjacent vehicle MB is present in front of the own vehicle MA in the traveling direction, the merging determination section 24 may determine that the driving lane of the own vehicle MA is a lane that continues through the merging point of the lanes (right lanes in FIGS. 3 to 7). In addition, when the intersection point is not in front of the own vehicle MA in the traveling direction, the merging determination section 24 may determine that the driving lane of the own vehicle MA is a lane that narrows at the merging point of the lanes (left lanes in FIGS. 3 to 7). Depending on whether the lane of the own vehicle MA is a lane that continues through the merging point or a lane that narrows at the merging point, the merging determination section 24 may transmit different merging signals to the alarm unit 30 and the vehicle control unit 40. In addition, the alarm unit 30 and the vehicle control unit 40 may perform alarm output and control depending on the received merging signal. Accordingly, appropriate controls can respectively be performed for a case where the own vehicle enters another lane and a case where another vehicle enters from another lane.

Instead of the millimeter-wave radar 11, a laser radar or an ultrasonic sensor may be used. Specifically, since an ultrasonic sensor is more inexpensive than the millimeter-wave radar 11, providing a plurality of ultrasonic sensors on the outer periphery of the own vehicle MA can acquire ranging data of an object with triangulation.

One of the in-vehicle camera 10 and the millimeter-wave radar 11 may be used. In this case, using a stereo camera as the in-vehicle camera 10 can ensure the accuracy of the distance to an object in the traveling direction and the accuracy of the distance to the lateral position of the object.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a lane merging determination apparatus is provided which includes a first generation section that generates a first path, which is a prospective traveling path of an own vehicle (MA); a second generation section that generates a second path corresponding to a traveling path of an adjacent vehicle (MB), which is one of vehicles present ahead of the own vehicle and runs in a lane adjacent to a driving lane of the own vehicle, based on a history of positions of the vehicles; an intersection determination section that determines whether or not the first path generated by the first path generation section and the second path generated by the second path generation section intersect with each other; and a merging determination section that determines that the lanes merge with each other in front of the own vehicle, if the intersection determination section determines that the first path and the second path intersect with each other.

According to the embodiment, the first path, which is a prospective traveling path of the own vehicle, is generated. In addition, the second path corresponding to a traveling path of the adjacent vehicle is generated from a history of positions of the vehicles running in a lane adjacent to the driving lane of the own vehicle. Then, it is determined whether or not the first path and the second path intersect with each other. If it is determined that the first path and the second path intersect with each other, it is determined that the lanes merge with each other in front of the own vehicle. Hence, using the first path, which is a prospective traveling path of the own vehicle, and the second path corresponding to the traveling path of the adjacent vehicle can determine merging of the lanes without recognizing a white line.

What is claimed is:

1. A lane merging determination apparatus for determining whether lanes of a road merge in front of an own vehicle, comprising:
    a processor;
    a non-transitory computer-readable storage medium; and
    a set of computer-executable instructions stored on the non-transitory computer-readable storage medium that cause the processor to:
    generate a first path, which is a prospective traveling path of the own vehicle, the first path generated based on a history of positions of the own vehicle;
    generate a second path corresponding to a traveling path of an adjacent vehicle, which is one of vehicles present ahead of the own vehicle and runs in a lane adjacent to a driving lane of the own vehicle, the second path generated based on a history of positions of the adjacent vehicle;
    determine whether or not the first path and the second path intersect with each other;
    determine that the lanes merge with each other in front of the own vehicle, based on determining that the first path and the second path intersect with each other;
    output a merging determination signal that indicates whether the lanes are determined to merge with each other in front of the own vehicle, the merging determination signal being output to at least one of an alarm unit and a vehicle control unit to perform at least one of an alarm output and a vehicle control based on whether the lanes are determined to merge with each other in front of the own vehicle;
    select the traveling path of the adjacent vehicle based on a lateral position, which is a position on a traveling path in a width direction of the own vehicle generated from the history of positions of the own vehicle and a lateral distance from a lateral position of the own vehicle; and
    generate the second path from the selected traveling path of the adjacent vehicle.

2. The lane merging determination apparatus according to claim 1, wherein
    the second path is defined as a traveling path, along which the adjacent vehicle has run.

3. The lane merging determination apparatus according to claim 1, wherein
    the second path is defined as a predicted path, which is a prospective traveling path of the adjacent vehicle predicted from a traveling path along which the adjacent vehicle has run.

4. The lane merging determination apparatus according to claim 1, wherein
    the set of computer-executable instructions stored on the non-transitory computer-readable storage medium further cause the processor to:
    generate a traveling path of a preceding vehicle based on a history of positions of the preceding vehicle, which is one of the vehicles and runs in the driving lane of the own vehicle; and
    generate the first path from the generated traveling path of the preceding vehicle.

5. The lane merging determination apparatus according to claim 1, wherein
    the set of computer-executable instructions stored on the non-transitory computer-readable storage medium further cause the processor to:
    detect position information of a stationary object present ahead of the own vehicle; and
    determine, based on determining that the first path and the second path intersect with each other, that the lanes merge with each other in front of the own vehicle, on condition that a position of the stationary object is in front of the own vehicle in a traveling direction.

6. The lane merging determination apparatus according to claim 1, wherein
    the set of computer-executable instructions stored on the non-transitory computer-readable storage medium further cause the processor to:
    determine, based on determining that the first path and the second path intersect with each other, that the lanes merge with each other in front of the own vehicle, on condition that a speed of the adjacent vehicle corresponding to the second path is higher than a speed of the own vehicle and exceeds a speed threshold value.

7. The lane merging determination apparatus according to claim 1, wherein
    the set of computer-executable instructions stored on the non-transitory computer-readable storage medium further cause the processor to:
    determine, based on determining that the first path and the second path intersect with each other, that the lanes merge with each other in front of the own vehicle, on condition that a distance between two adjacent vehicles, which correspond to the second path and are present in a longitudinal direction, is larger than a distance between the own vehicle and a preceding vehicle with respect to the own vehicle and exceeds a distance threshold value.

8. The lane merging determination apparatus according to claim 1, wherein
    the set of computer-executable instructions stored on the non-transitory computer-readable storage medium further cause the processor to:
    determine, based on an intersection point of the first path and the second path being present at a front of the own vehicle in a traveling direction, that the driving lane of the own vehicle is a lane that continues through a merging point of the lanes; and
    determine, based on the intersection point not being present at the front of the own vehicle in the traveling direction, that the driving lane of the own vehicle is a lane that narrows at the merging point.

9. A method for determining whether lanes of a road merge in front of an own vehicle, comprising:
    generating a first path, which is a prospective traveling path of the own vehicle, the first path generated based on a history of positions of the own vehicle;
    generating a second path corresponding to a traveling path of an adjacent vehicle, which is one of vehicles present ahead of the own vehicle and runs in a lane adjacent to a driving lane of the own vehicle, the second path generated based on a history of positions of the adjacent vehicle;

determining whether the first path and the second path intersect with each other;

determining that the lanes merge with each other in front of the own vehicle, based on determining that the first path and the second path intersect with each other;

outputting a merging determination signal, which indicates whether the lanes are determined to merge with each other in front of the own vehicle, to at least one of an alarm unit and a vehicle control unit to perform at least one of an alarm output and a vehicle control based on whether the lanes are determined to merge with each other in front of the own vehicle;

selecting the traveling path of the adjacent vehicle based on a lateral position, which is a position on a traveling path in a width direction of the own vehicle generated from the history of positions of the own vehicle and a lateral distance from a lateral position of the own vehicle; and generating the second path from the selected traveling path of the adjacent vehicle.

\* \* \* \* \*